(12) United States Patent
Katayama

(10) Patent No.: US 7,426,230 B2
(45) Date of Patent: Sep. 16, 2008

(54) SEALED DEVICE FOR PREVENTING EXHAUST GAS LEAKAGE

(75) Inventor: Hideo Katayama, Tokyo (JP)

(73) Assignee: Setsu Anzai, Tokyo (JP)

( * ) Notice: Subject to any disclaimer, the term of this patent is extended or adjusted under 35 U.S.C. 154(b) by 664 days.

(21) Appl. No.: 11/042,375

(22) Filed: Jan. 25, 2005

(65) Prior Publication Data
US 2006/0162386 A1 Jul. 27, 2006

(51) Int. Cl.
F27D 17/00 (2006.01)
(52) U.S. Cl. .................. 373/9; 373/77; 266/216
(58) Field of Classification Search .......... 373/9, 373/77, 84, 93, 22, 86, 87, 79, 55, 69, 73, 373/80, 81, 82, 95, 96; 65/157, DIG. 4, 337; 266/275, 186, 216, 240, 236; 432/252
See application file for complete search history.

(56) References Cited
U.S. PATENT DOCUMENTS 4,065,634 A * 12/1977 Beizerov et al. ............ 373/77
5,153,894 A * 10/1992 Ehle et al. ................... 373/80
6,274,081 B1 * 8/2001 Fuchs ......................... 266/216

* cited by examiner

Primary Examiner—Quang T Van
(74) Attorney, Agent, or Firm—Hogan & Hartson LLP

(57) ABSTRACT

A device that prevents exhaust gas leakage during movement of an electrode in an electric furnace. An electrode holder is attached to the electrode. An actuator moves the electrode between first and second positions within an aperture formed in an upper portion of the furnace. A fixed section is attached to a waste charging station. A first moving section is moveably coupled with the fixed section, a second moving section is moveably coupled with the first section and fixedly attached to the electrode holder on a first side, and a third moving section is fixedly attached to the electrode holder on a second side opposite the first side. The device moves between a retracted position in which the first and second moving sections are adjacent to the fixed member, and an extended position in which the first and second moving sections are distal from the fixed member.

8 Claims, 6 Drawing Sheets

SEALED DEVICE FOR PREVENTING EXHAUST GAS LEAKAGE

BACKGROUND OF THE INVENTION

1. Field of the Invention

The present invention relates to electric furnace technology and, in particular, to a device for preventing exhaust gas leakage during the movement of electrodes in an electric furnace.

2. Description of the Related Art

A rectangular space is provided in the upper part of an electric furnace for the horizontal movement of the electrodes. However, with this setup, there is the problem that exhaust gas from inside the furnace escapes to the outside from the rectangular space. There currently exists a need to reduce exhaust gas leakage in electric furnaces.

SUMMARY OF THE INVENTION

The present teachings concern a device for which metal plates are installed at the top of the rectangular space provided in the upper part of the furnace to facilitate the horizontal movement of electrodes arranged vertically inside the furnace. Insulating material is firmly attached to an interior portion of the metal plates. The metal plates are arranged to move together with the electrodes when they move from side-to side-in the rectangular space for the purpose of preventing the leakage of gas from inside the furnace.

The present teachings disclose a device for preventing exhaust gas leakage during the movement of an electrode in an electric furnace having a waste charging section, an electrode holder attached to the electrode, and an actuator for moving the electrode between a first and second position within an aperture formed in an upper portion of the electric furnace. The device comprises a fixed section attached to the waste charging station of the electric furnace, wherein the fixed section is positioned over at least a portion of the aperture. The device comprises a first moving section moveably coupled with the fixed section, wherein the first moving section is positioned over at least a portion of the aperture, and wherein the first moving section includes a first stopper that restricts the displacement of the first moving section with respect to the fixed section when the electrode is moved from the first position to the second position. The device comprises a second moving section moveably coupled with the first section and fixedly attached to the electrode holder on a first side, wherein the second moving section is positioned over at least a portion of the aperture, and wherein the second moving section includes a second stopper that restricts the displacement of the second moving section with respect to the first moving section when the electrode is moved from the first position to the second position.

In one aspect, the device further comprises a third moving section fixedly attached to the electrode holder on a second side opposite the first side, wherein the third moving section is positioned over at least a portion of the aperture. The fixed section, the first moving section, the second moving section, and the third moving section have inner surfaces with insulating material attached thereto, and wherein the insulating material substantially prevents heat from being radiated to the exterior of the electric furnace. The upper portion of the electric furnace comprises metal plates with the aperture formed therein. The aperture comprises a rectangular space facilitates horizontal movement of the electrodes with respect to the upper portion of the electric furnace.

In another aspect, the first position of the electrode relates to a retracted position of the device such that the first and second moving sections are positioned adjacent to the fixed member, and wherein the second position of the electrode relates to an extended position of the device such that the first and second moving sections are positioned distally from the fixed member. The fixed section, the first moving section, the second moving section, and the third moving section may be formed of metal.

These and other objects and advantages of the present teachings will become more fully apparent from the following description taken in conjunction with the accompanying drawings.

DETAILED DESCRIPTION OF THE PREFERRED EMBODIMENTS

Reference will now be made to the drawings, wherein like numerals refer to like parts throughout. As will be described in greater detail herein below, the present teachings relate to a device for preventing exhaust gas leakage during movement of electrodes in an electric furnace.

Figure 1:
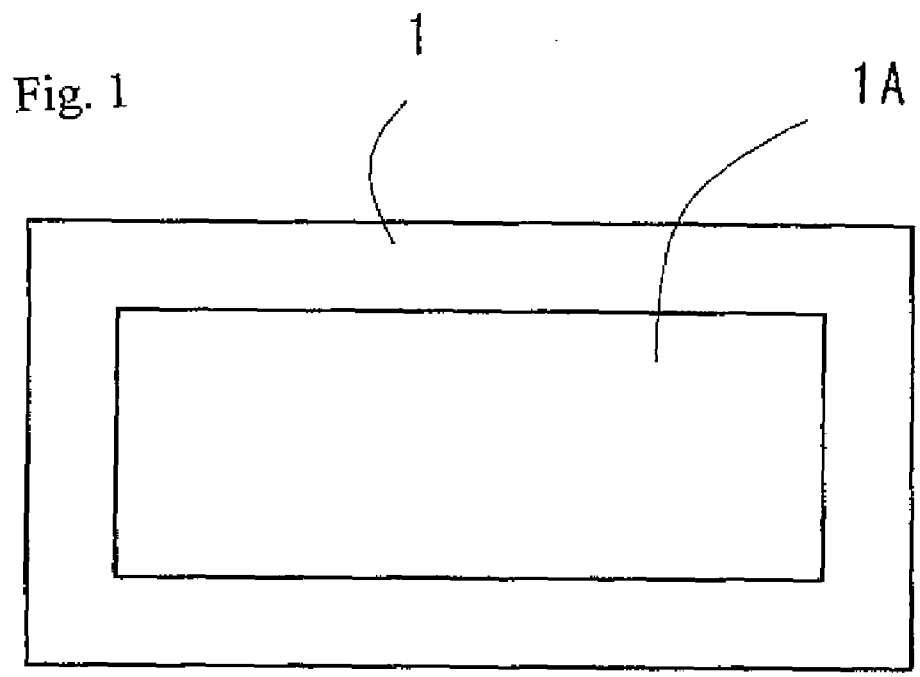
FIG. 1 shows an upper portion of an electric furnace.
Figure 2:
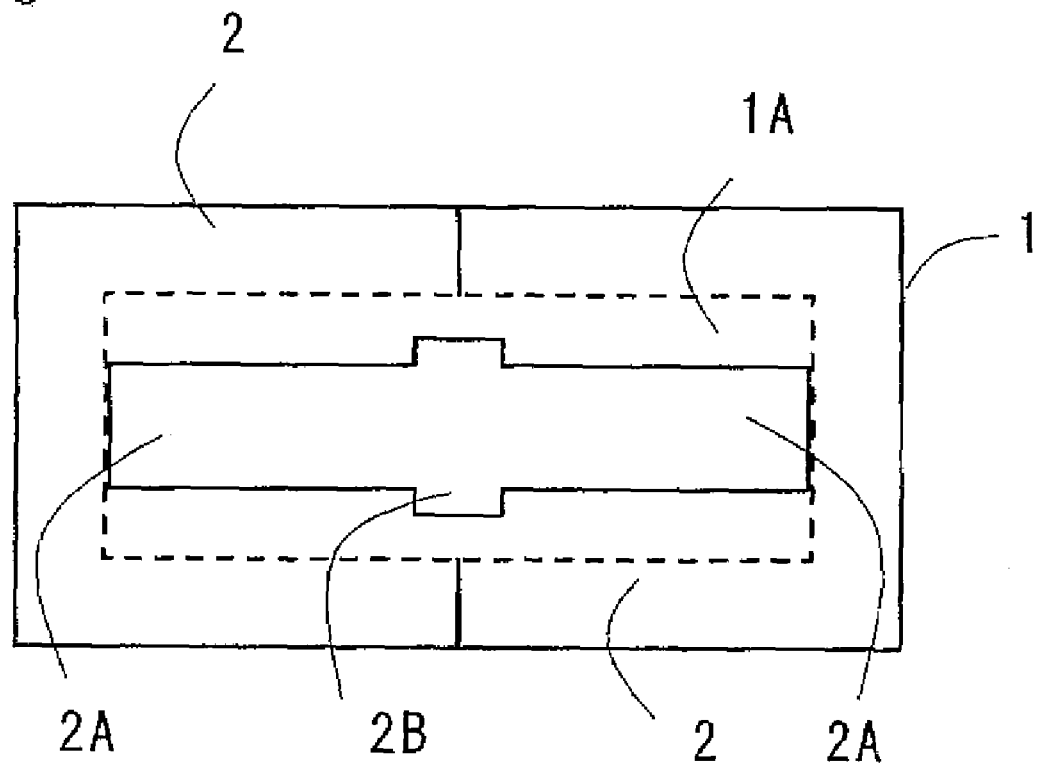
FIG. 2 shows the electric furnace with metal plates.
Figure 3:
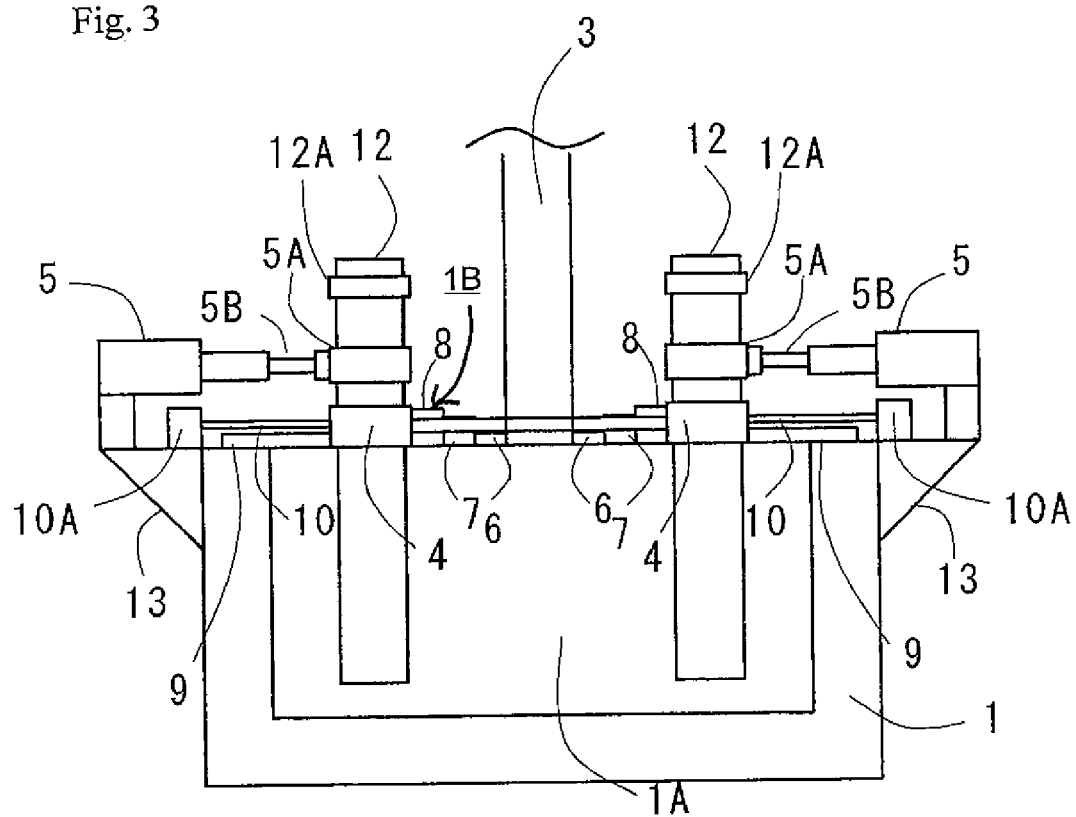
FIGS. 3-5 show the electric furnace with an exhaust gas leakage prevention device.
Figure 4:
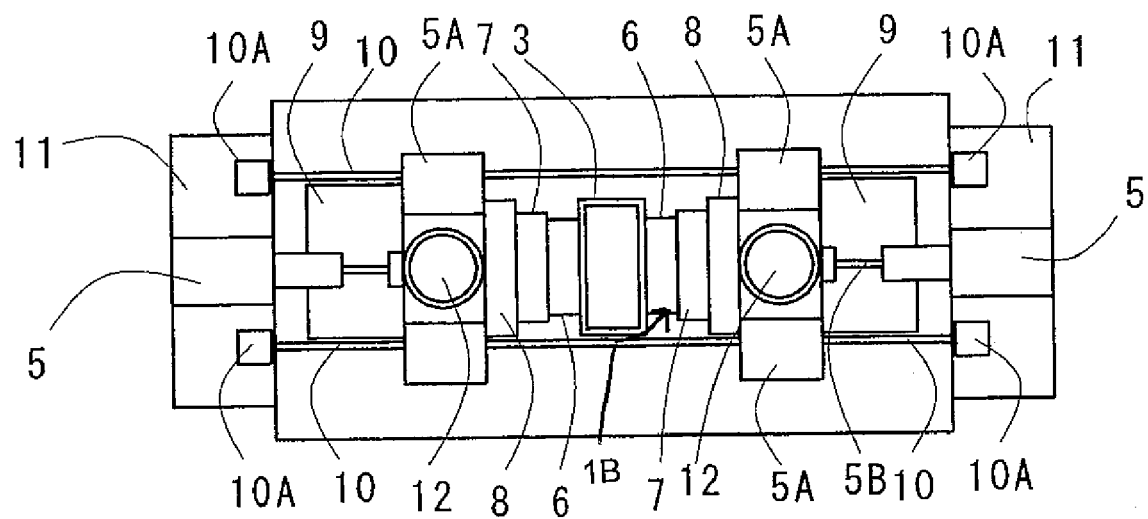

FIG. 1 shows an upper portion of the electric furnace 1. FIG. 2 shows the electric furnace 1 with one or more metal plates 2 and a rectangular space 1A provided in the upper portion of the electric furnace 1. FIG. 3 shows a cross sectional view of a lateral aspect of the electric furnace 1 with an exhaust gas leakage prevention device 1B installed, and a lateral view shows the exhaust gas leakage prevention device 1B installed in the upper part of the electric furnace 1. FIG. 4 shows a top view of the electric furnace 1 with the exhaust gas leakage prevention device 1B installed.

Referring to FIGS. 1-2, at the top of the interior 1A of the electric furnace 1, metal plates 2 having insulating material firmly attached to their undersides are installed on both sides of the electric furnace 1 to form rectangular apertures or spaces 2A including an aperture or space for charging incineration waste at the center 2B. Referring to FIGS. 3-4, electrodes 12 are positioned at pre-determined locations within the rectangular spaces 2A formed on both sides of the electric furnace 1 using electrode holders 4. In addition, a fixed section 5A of the electrodes 12 is connected to a cylinder 5B that is attached to an actuator 5 for moving the electrodes 12, for example, horizontally in a side-to-side manner with respect to the orientation of the electric furnace 1. It should be appreciated by those skilled in the art that the electrodes may be adapted to move in any direction depending on the orientation of the electric furnace 1.

As shown in FIGS. 3-4, the electric furnace 1 comprises a waste charging section 3, electrode holders 4 attached to the electrodes 12, and the actuator 5 for moving the electrodes 12 between a first and second position within the aperture or rectangular space 1A formed in the upper portion of the electric furnace 1. The device 1B for preventing exhaust gas leakage during the movement of the electrodes 12 comprises a fixed section 6, a first moving section 7, a second moving section 8, and a third moving section 9.

The fixed section 6 is attached to the waste charging station 3 of the electric furnace 1 such that the fixed section 6 is positioned over at least a portion of the rectangular space 1A. The first moving section 7 is moveably coupled with the fixed section 6 such that the first moving section 7 is positioned over at least a portion of the rectangular space 1A. In addition, the first moving section 7 includes stoppers or inserts 7A, 7B (FIG. 9) that restrict the displacement of the first moving section 7 with respect to the fixed section 6 when the electrodes 12 are moved from the first position to the second position.

In one aspect, the first position of the electrodes 12 relates to a retracted position of the device 1B such that the first and second moving sections 7, 8 are positioned adjacent to the fixed member 6. The second position of the electrodes 12 relates to an extended position of the device 1B such that the first and second moving sections 7, 8 are positioned distally from the fixed member 6. These and other aspects of the present teachings will be described herein below.

The second moving section 8 is moveably coupled with the first moving section 7 and fixedly attached to the electrode holder 4 on a first side such that the second moving section 8 is positioned over at least a portion of the rectangular space 1A. In addition, the second moving section 8 includes stoppers or inserts 8A (FIG. 8) that restrict the displacement of the second moving section 8 with respect to the first moving section 7 when the electrodes 12 are moved from the first position to the second position. The device 1B further comprises a third moving section 9 fixedly attached to the electrode holder 4 on a second side opposite the first side such that the third moving section 9 is positioned over at least a portion of the rectangular space 1A.

In one aspect, sections of the exhaust gas leakage prevention device 1B including the fixed section 6, the first moving section 7, the second moving section 8, and the third moving section 9 may be formed of metal. In addition, as shown in FIGS. 3-4, the electrodes 12 may include a plurality of electrodes 12, and the device 1B for preventing exhaust gas leakage may include a plurality of fixed sections 6, first moving sections 7, second moving sections 8, and third moving sections 9 without departing from the scope of the present teachings.

Though the above description enables both electrodes 12 to be moved, for example, from side-to-side, gas produced by the combustion of waste that is not sucked up by an exhaust gas suction pipe 3 may escape from the rectangular spaces 2A on both sides of the electric furnace 1.

Figure 5:
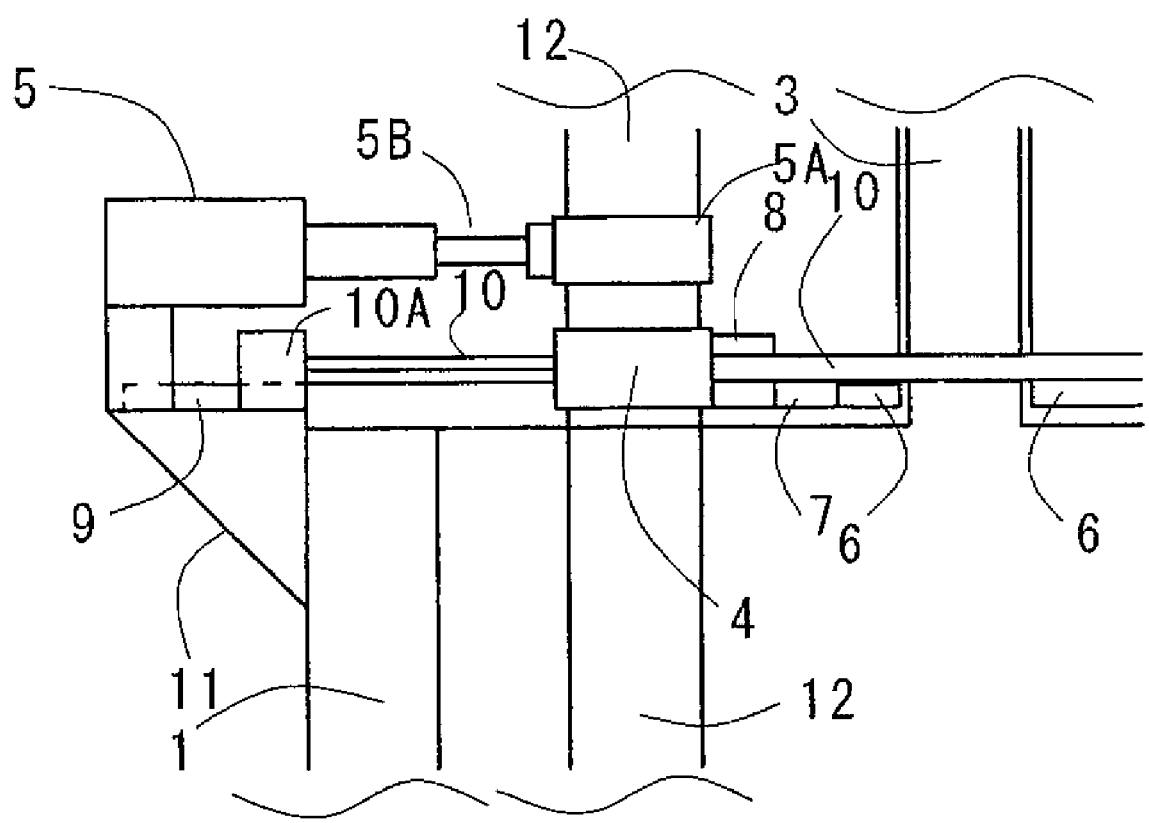
Figure 6:
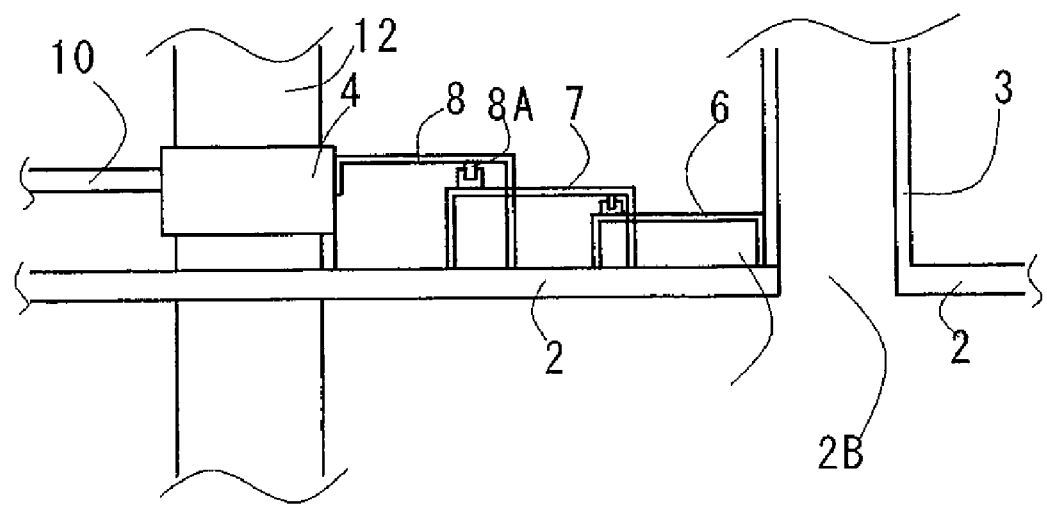
FIG. 6 shows the exhaust gas leakage prevention device of the electric furnace in an extended position.
Figure 7:
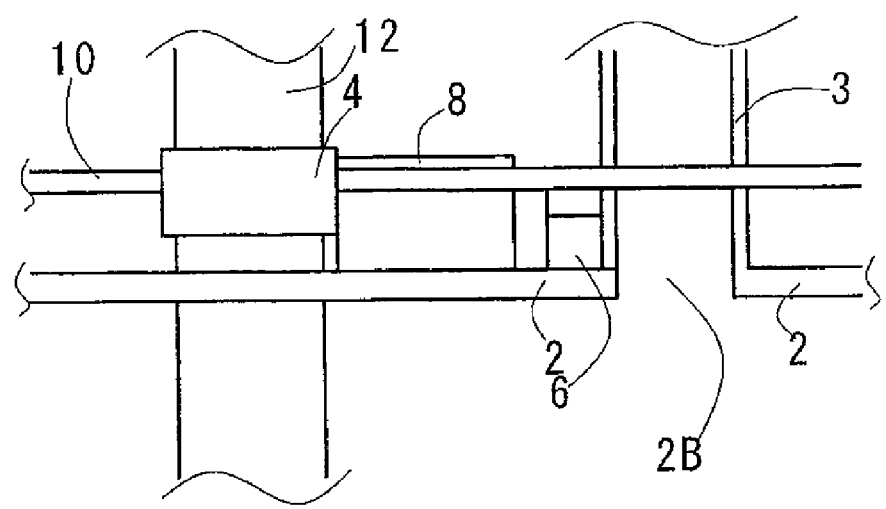
FIG. 7 shows the exhaust gas leakage prevention device of the electric furnace in a retracted position.
Figure 8:
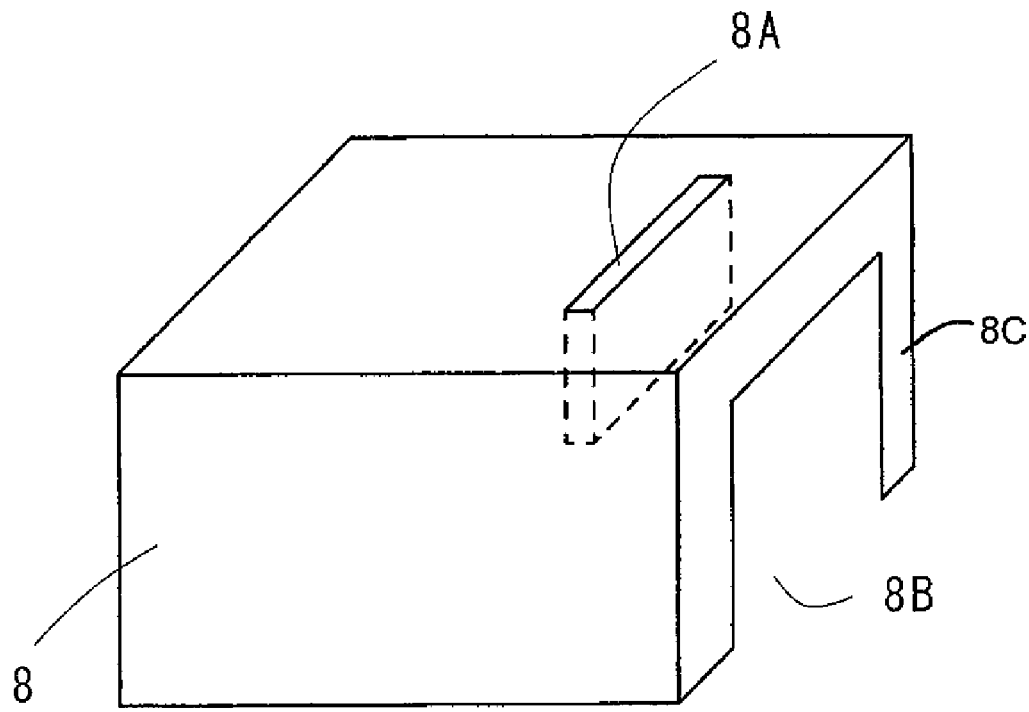
FIG. 8 shows a perspective view of a second moving section of the exhaust gas leakage prevention device.
Figure 9:
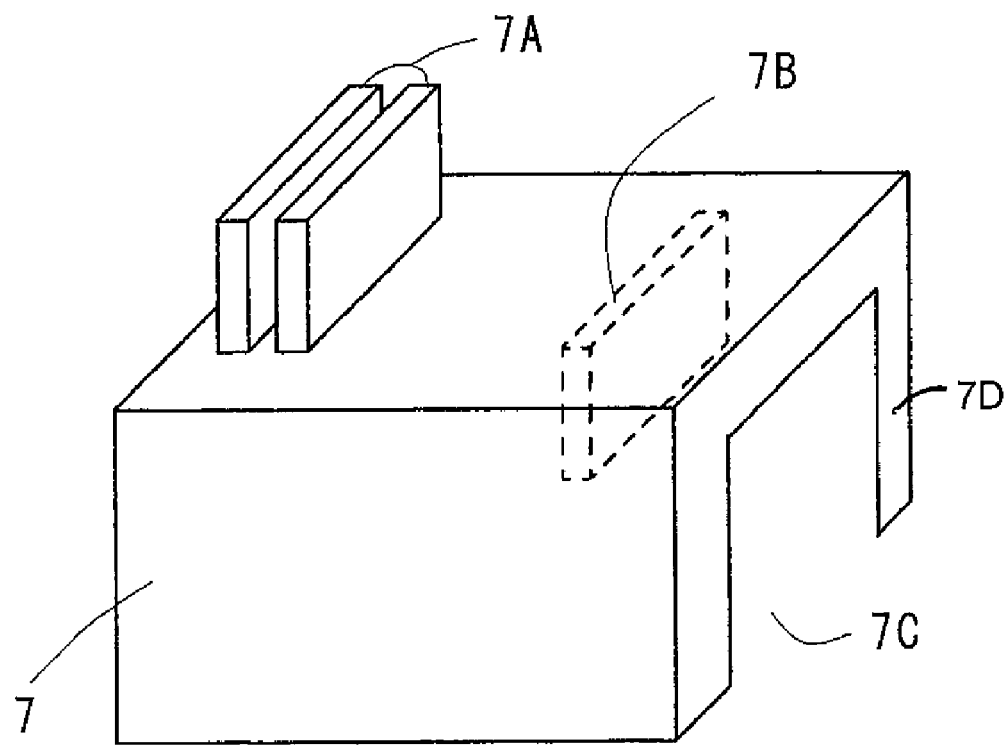
FIG. 9 shows a perspective view of a first moving section of the exhaust gas leakage prevention device.
Figure 10:
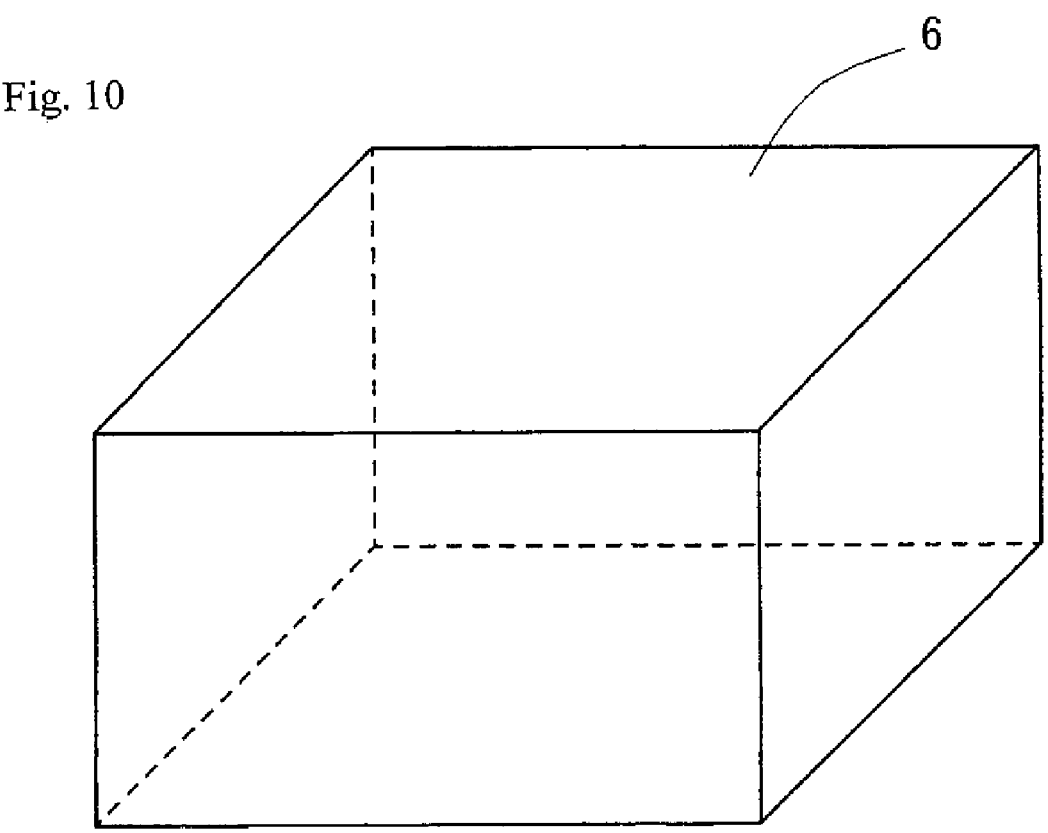
FIGS. 10-11 show a perspective view of a fixed section of the exhaust gas leakage prevention device.
Figure 11:
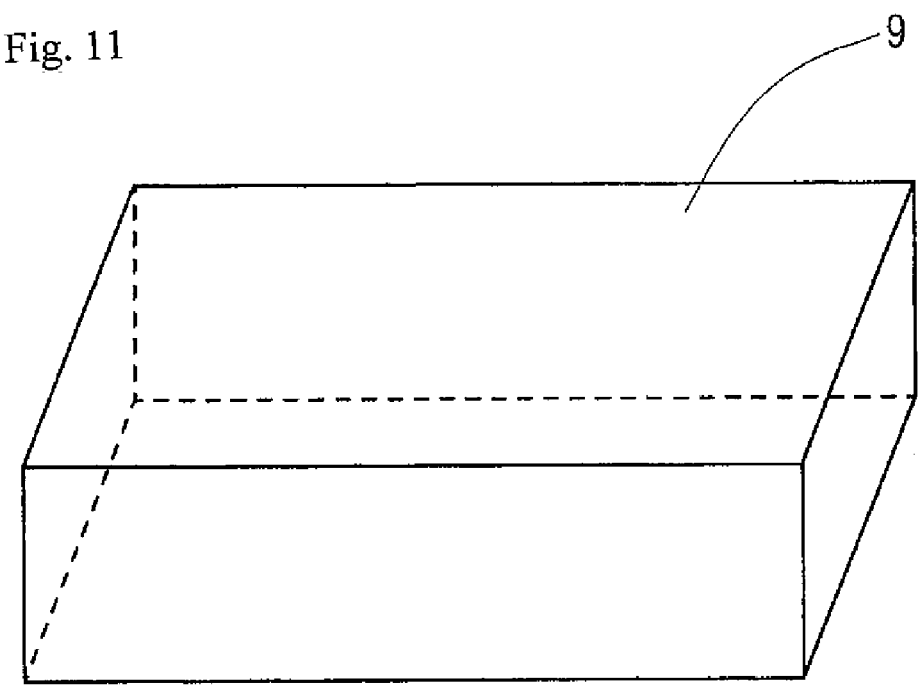

FIG. 5 shows a magnified lateral view of part of the exhaust gas leakage prevention device 1B. FIG. 6 is a cross-sectional view showing the exhaust gas leakage prevention device 1B in an extended position due to the movement of the electrodes 12 in a first direction. FIG. 7 is a cross-sectional view showing the gas leakage prevention device 1B in a retracted position due to the movement of the electrodes 12 in a second direction that is, in one aspect, in a direction opposite of the first direction. FIG. 8 is an oblique perspective of a second moving section 8 of the exhaust gas leakage prevention device 1B. FIG. 9 is an oblique perspective of a first moving section of the exhaust gas leakage prevention device 1B. FIG. 10 is an oblique perspective of the fixed section 6 of the exhaust gas leakage prevention device 1B. FIG. 11 is another oblique perspective of the fixed section 6 of the exhaust gas leakage prevention device 1B.

The exhaust gas leakage prevention device 1B comprises the fixed section 6, the first moving section 7, the second moving section 8, and third moving section 9 as shown in FIGS. 5-11. In one aspect, the inner surfaces of sections 6, 7, 8, 9, that form the exhaust gas leakage prevention device 1B, are covered with an insulating material. The insulating material absorbs heat radiating from the interior of the electric furnace 1. The insulating material substantially prevents heat from being radiated to the exterior of the electric furnace 1 via the exhaust gas leakage prevention device 1B.

Referring to FIGS. 6, 8, and 9, due to the combination of stoppers 7A, provided on the first moving section 7 and the second moving section 8, and the inserts 7B, 8A, the first and second moving sections move in unison with the electrodes 12 when they move horizontally from side-to-side.

FIGS. 5-6 show the exhaust gas prevention device 1B in an extended position, and FIG. 7 shows the exhaust gas prevention device 1B in a retracted position. As shown in FIGS. 5-7, the second moving section 8 is fixed to the electrode holders 4. The fixed sections 6 and the waste charging section 3 are also fixed to the electrode holders 4. In one aspect, as the fixed sections 6 are attached to the exterior of the waste charging section 3, they remain fixed in place when the electrodes 12 move horizontally from side-to-side. Since these parts are constantly fixed to the upper surface of the rectangular spaces 2A, there is less likely to be leakage of exhaust gas at the first and second moving sections 7, 8, or other parts that move, when such parts are moving together with the electrodes 12, or from the rectangular spaces 2A.

Additionally, as shown in FIGS. 5-7, the third moving section 9 is also fixed to the electrode holders 4. Even though the electrodes 12 move from horizontally side-to-side with this configuration, there is less likely to be gas leakage from this section since the rectangular spaces 2A on both sides of the electric furnace 1 are substantially constantly covered.

In one aspect, the purpose of the opening 8B on one side of the first and second moving sections 7, 8, as shown in FIGS. 8 and 9, is to have the second moving section 8 move from side-to-side above the first moving section 7. These openings, indicated as 7C and 8B, are firmly attached to stoppers 7D, 8C, which comprise, for example, lightwood, so there is less chance of exhaust gas leakage to the exterior of the electric furnace 1. The opening on one side of the first moving section 7 is provided for sideways movement within the fixed section 6. When the electrodes 12 are moved by the actuators 5, one on each side of the electric furnace 1, the components of the exhaust gas prevention device 1B are arranged such that the components move over the cylinders 5B. For this reason, there is less obstruction of movement of the exhaust gas leakage prevention device 1B including the fixed section 6, the first moving section 7, the second moving section 8, and the third moving section 9 as shown in FIG. 4.

Advantageously, the exhaust gas leakage prevention device 1B having the structure described in the foregoing is configured to prevent leakage of exhaust gas produced by the electric furnace 1 whether the electrodes 12 were moving horizontally, for example, from side-to side or fixed in place.

Although the preferred embodiments of the present teachings have shown, described, and pointed out the fundamental novel features of the invention as applied to those embodiments, it will be understood that various omissions, substitutions, and changes in the form of the detail of the device illustrated may be made by those skilled in the art without departing from the spirit of the present teachings. Consequently, the scope of the invention should not be limited to the foregoing description but is to be defined by the appended claims.

What is claimed is:

1. A device for preventing exhaust gas leakage during the movement of an electrode in an electric furnace having a waste charging section, an electrode holder attached to the electrode, and an actuator for moving the electrode between a first and second position within an aperture formed in an upper portion of the electric furnace, the device comprising:
    a fixed section attached to the waste charging station of the electric furnace, wherein the fixed section is positioned over at least a portion of the aperture;
    a first moving section moveably coupled with the fixed section, wherein the first moving section is positioned over at least a portion of the aperture, and wherein the first moving section includes a first stopper that restricts the displacement of the first moving section with respect to the fixed section when the electrode is moved from the first position to the second position; and
    a second moving section moveably coupled with the first moving section and fixedly attached to the electrode holder on a first side, wherein the second moving section is positioned over at least a portion of the aperture, and wherein the second moving section includes a second stopper that restricts the displacement of the second moving section with respect to the first moving section when the electrode is moved from the first position to the second position.

2. The device claim 1, wherein the device further comprises a third moving section fixedly attached to the electrode holder on a second side opposite the first side, wherein the third moving section is positioned over at least a portion of the aperture.

3. The device of claim 2, wherein the fixed section, the first moving section, the second moving section, and the third moving section have inner surfaces with insulating material attached thereto, and wherein the insulating material substantially prevents heat from being radiated to the exterior of the electric furnace.

4. The device of claim 2, wherein the fixed section, the first moving section, the second moving section, and the third moving section are formed of metal.

5. The device of claim 2, wherein the electrodes includes a plurality of electrodes, and wherein the device for preventing exhaust gas leakage includes a plurality of fixed sections, first moving sections, second moving sections, and third moving sections.

6. The device claim 1, wherein the upper portion of the electric furnace comprises metal plates with the aperture formed therein.

7. The device of claim 1, wherein the aperture comprises a rectangular space facilitates horizontal movement of the electrodes with respect to the upper portion of the electric furnace.

8. The device of claim 1, wherein the first position of the electrode relates to a retracted position of the device such that the first and second moving sections are positioned adjacent to the fixed member, and wherein the second position of the electrode relates to an extended position of the device such that the first and second moving sections are positioned distally from the fixed member.

* * * * *